US008958003B2

(12) United States Patent
Tsukikawa

(10) Patent No.: US 8,958,003 B2
(45) Date of Patent: Feb. 17, 2015

(54) IMAGE CONFIRMATION APPARATUS

(75) Inventor: Takenori Tsukikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 12/973,721

(22) Filed: Dec. 20, 2010

(65) Prior Publication Data

US 2011/0149107 A1    Jun. 23, 2011

(30) Foreign Application Priority Data

Dec. 22, 2009    (JP) ................................ 2009-291201

(51) Int. Cl.
*H04N 5/222*    (2006.01)
*H04N 5/232*    (2006.01)
*G11B 27/34*    (2006.01)

(52) U.S. Cl.
CPC ............... *H04N 5/232* (2013.01); *G11B 27/34* (2013.01)
USPC ................. 348/333.05; 348/207.1; 348/222.1

(58) Field of Classification Search
USPC ................. 348/207.1, 220.1, 333.01, 333.05, 348/222.1
See application file for complete search history.

(56) References Cited

U.S. PATENT DOCUMENTS

| 6,727,949 | B1* | 4/2004 | Saruwatari et al. | ........... 348/349 |
| 7,154,550 | B1* | 12/2006 | Kaku | ........................ 348/333.11 |
| 2002/0054232 | A1* | 5/2002 | Inagaki | .......................... 348/372 |
| 2007/0222883 | A1* | 9/2007 | Iwauchi | .................... 348/333.01 |
| 2008/0152226 | A1 | 6/2008 | Ryuto | |

* cited by examiner

*Primary Examiner* — Paul Berardesca
(74) *Attorney, Agent, or Firm* — Carter, DeLuca, Farrell & Schmidt, LLP

(57) ABSTRACT

An apparatus determines whether continuous shooting has been performed by an imaging apparatus based on an imaging signal transmitted from the imaging apparatus. If it is determined that the continuous shooting performed by the imaging apparatus and next shooting different from the continuous shooting is performed before all images related to the continuous shooting are acquired, the apparatus acquires an image of the next shooting on a priority basis compared to images of the continuous shooting, and displays the image acquired from the imaging apparatus on a display unit.

25 Claims, 12 Drawing Sheets

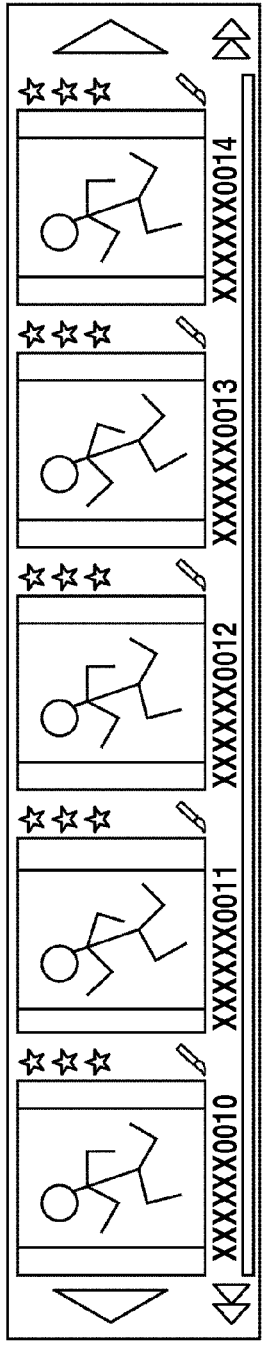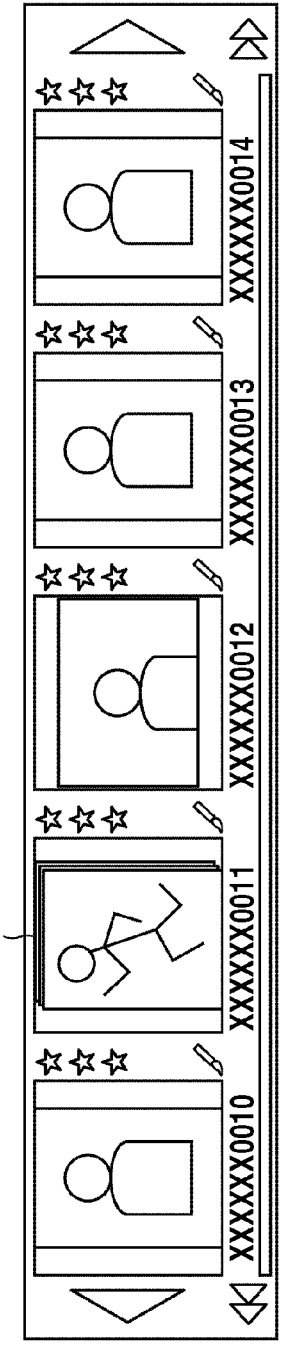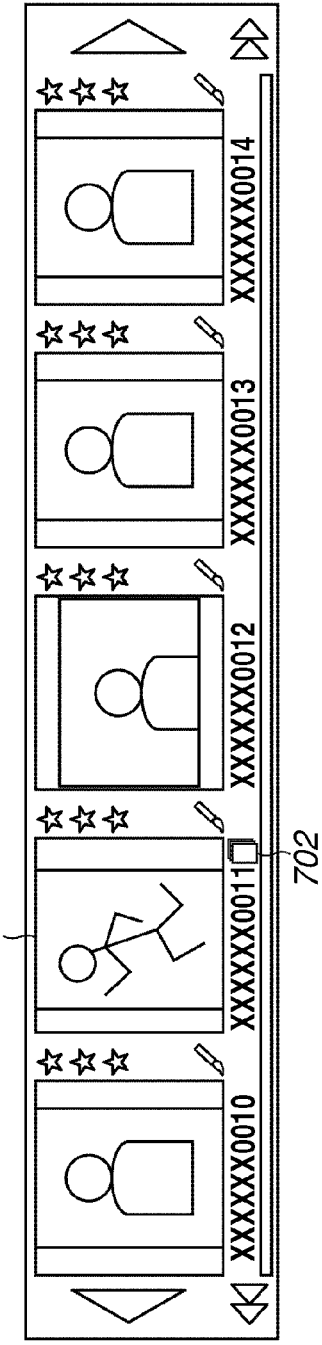

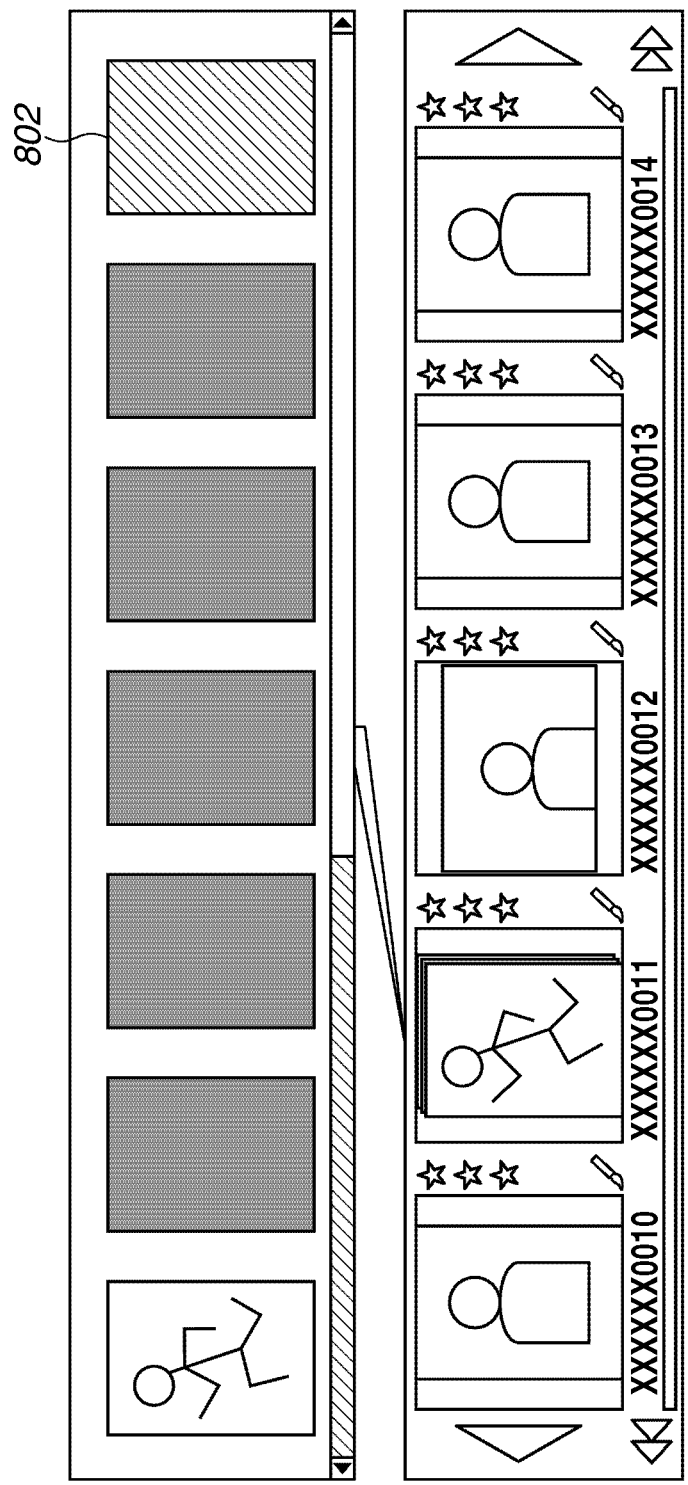

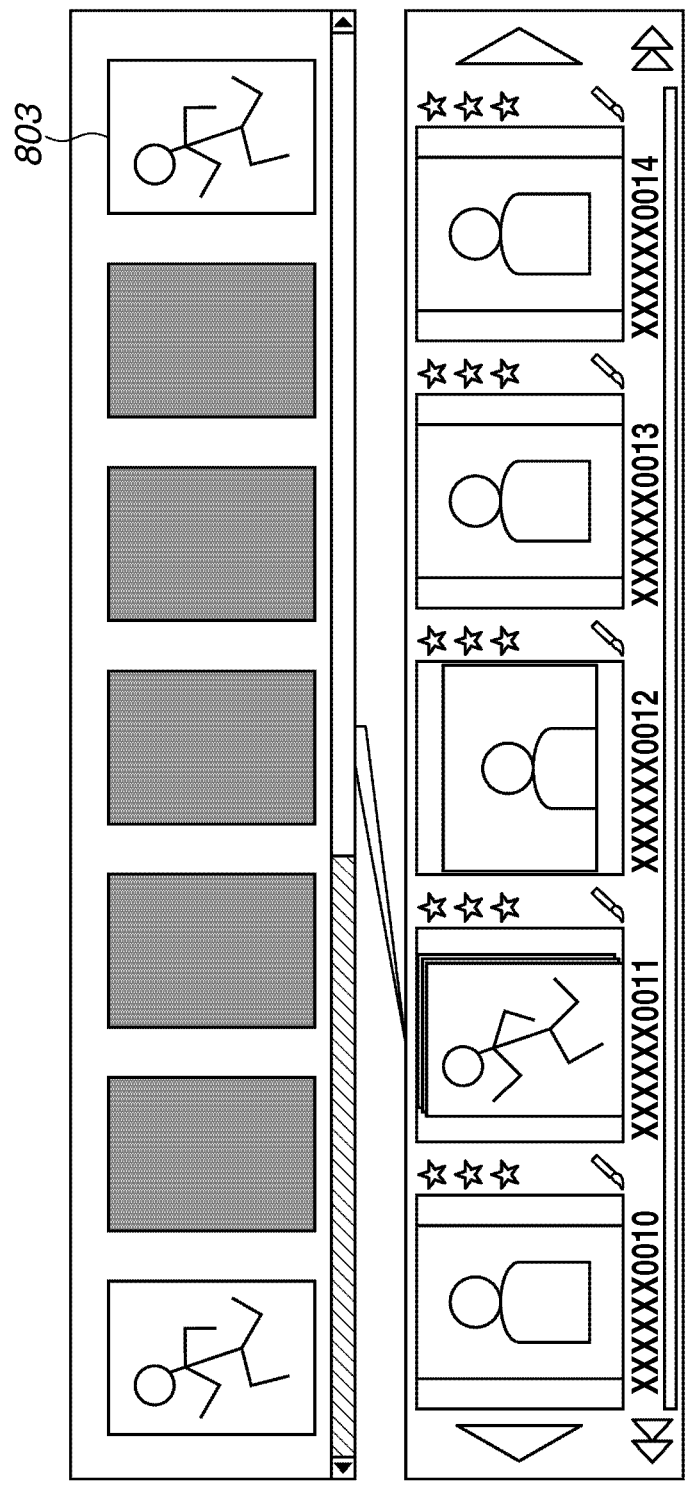

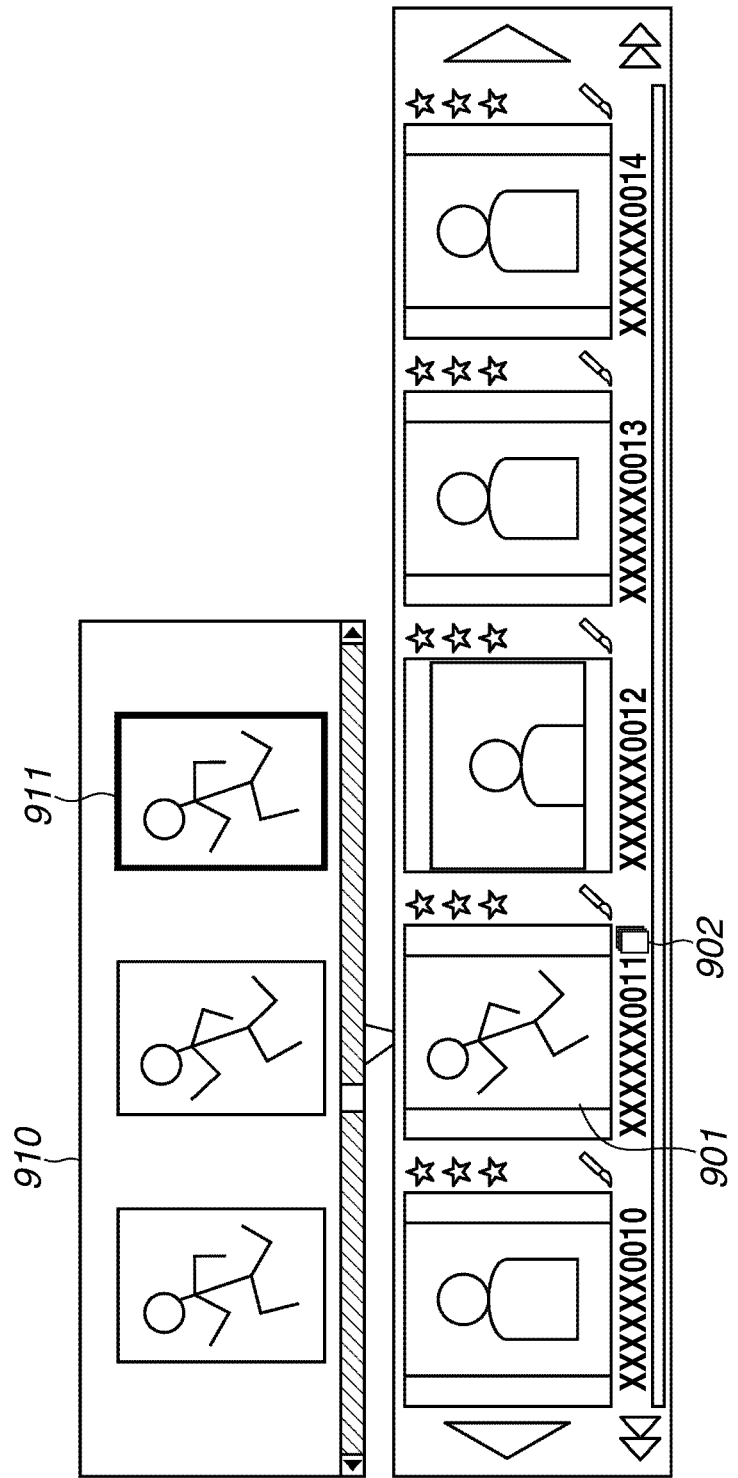

IMAGE CONFIRMATION APPARATUS

BACKGROUND OF THE INVENTION

1. Field of the Invention

The present invention relates to an image confirmation apparatus configured to confirm an image captured by an imaging apparatus.

2. Description of the Related Art

When a user of an imaging apparatus captures images, the user checks whether the images are captured as desired or displays a list of a plurality of captured images to select a desired image. Such operation is called image confirmation.

Conventionally, a screen of the imaging apparatus is used to confirm captured images. However, since the screen size of the imaging apparatus is small, it is not useful in precisely confirming the captured image. Under such circumstances, United State Patent Application No. 20080152226 discusses a method for sequentially transferring images captured by an imaging apparatus to an information processing terminal outside of the imaging apparatus and confirming the images on a large screen of the information processing terminal.

However, according to the method discussed in United State Patent Application No. 20080152226, since images captured by continuous shooting are sequentially transferred to the information processing terminal, it is difficult for the user to check images of different scenes immediately after the continuous shooting. This is because, the time it takes to transfer the images captured by the continuous shooting from the imaging apparatus to the information processing terminal is longer than a time length of the continuous shooting. Thus, as the number of the images captured by the continuous shooting increases, the user needs to wait longer time to confirm images of the next scene.

SUMMARY OF THE INVENTION

According to an aspect of the present invention, an apparatus includes an acquisition device configured to acquire an image from an imaging apparatus based on an imaging signal related to shooting received from the imaging apparatus, a determination device configured to determine whether continuous shooting has been performed by the imaging apparatus based on the imaging signal related to shooting transmitted from the imaging apparatus, an adjustment device configured to, if the continuous shooting performed and next shooting different from the continuous shooting is performed before all images related to the continuous shooting are acquired, adjust image acquisition such that image captured by the next shooting is acquired on a priority basis compared to an image related to the continuous shooting, and a display device configured to display the acquired image on a display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A to 7C illustrate examples of an image list display of images captured by continuous shooting.

FIGS. 8A to 8C illustrate examples of an image list display when images captured by continuous shooting are acquired.

FIG. 9 illustrates an example of an image list display when a user selects a representative image.

DESCRIPTION OF THE EMBODIMENTS

Various exemplary embodiments, features, and aspects of the invention will be described in detail below with reference to the drawings.

Figure 1:
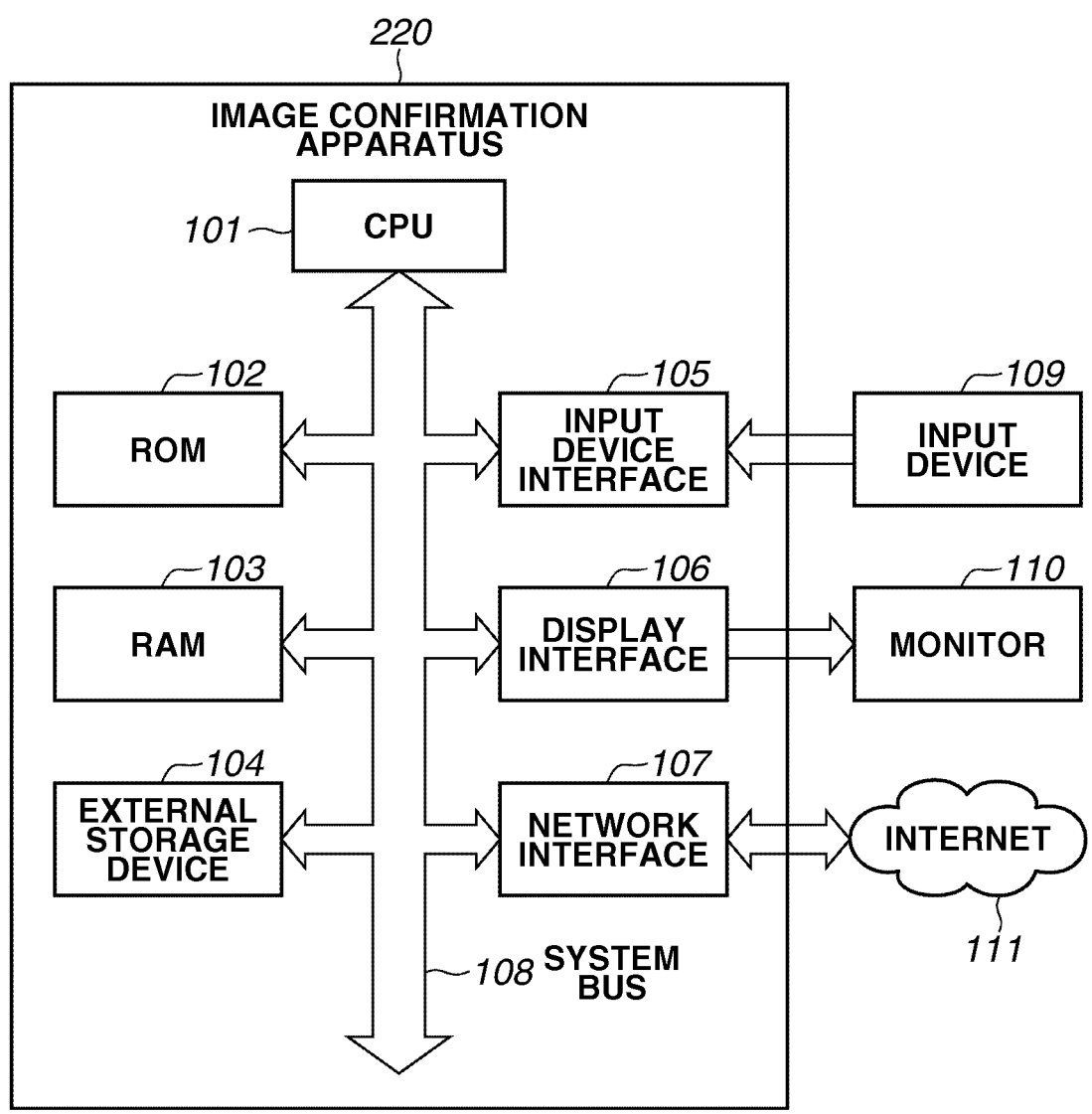
FIG. 1 illustrates an example of a hardware configuration of a captured image confirmation apparatus.

An example of a hardware configuration of an image confirmation apparatus (computer) used for confirmation of a captured image according to an exemplary embodiment of the present invention is described with reference to FIG. 1. FIG. 1 illustrates an example of a hardware configuration of an image confirmation apparatus. The image confirmation apparatus can be implemented by a single computer or a plurality of computers each of which has a different function as necessary. If the image confirmation apparatus is realized by a plurality of computers, the computers are communicably connected to one another by a local area network (LAN) or the like.

In FIG. 1, a central processing unit (CPU) 101 controls the entire image confirmation apparatus 220. A read only memory (ROM) 102 stores a program and a parameter that require no updates. A random access memory (RAM) 103 temporarily stores a program and data supplied from an external apparatus or the like. An external storage device 104 may include a hard disk or a memory card fixed to the image confirmation apparatus 220, or an optical disk or a memory card, such as a flexible disk (FD) or a compact disk (CD) which can be removed from the image confirmation apparatus 220.

An input device interface 105 is an interface to an input device which a user uses for inputting data. The input device includes a pointing device, a keyboard 109, or the like. A display interface 106 is an interface to a monitor 110 which displays data stored in or supplied to the image confirmation apparatus 220. A network interface 107 is used to connect to a network line such as the Internet 111. Each of the devices 101 to 107 of the image confirmation apparatus 220 is communicably connected via a system bus 108.

The functions and processing of the image confirmation apparatus 220 described with reference to the flowchart below are realized by the CPU 101 executing processing based on a program.

Figure 2:
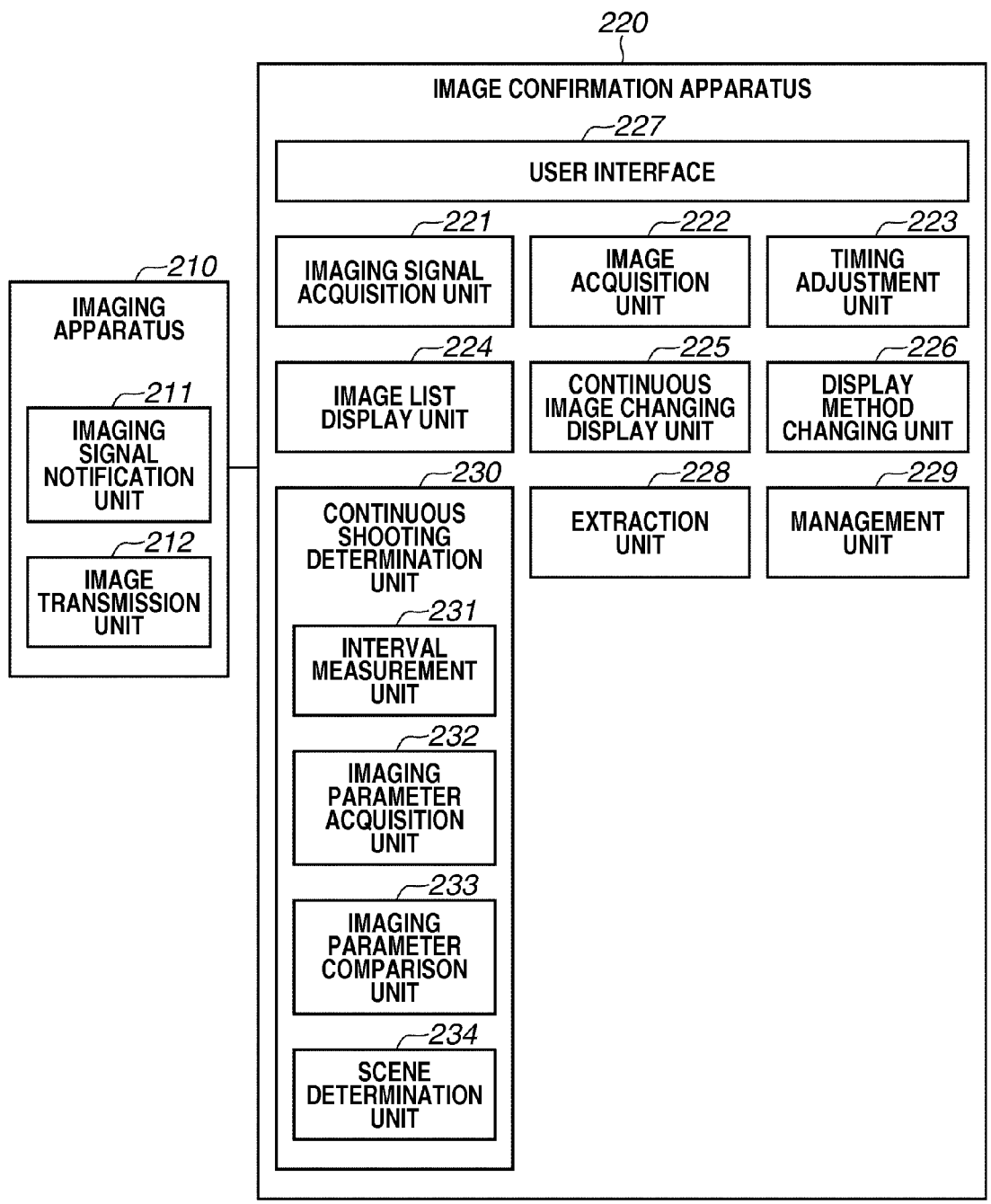
FIG. 2 illustrates an example of a functional configuration of the captured image confirmation apparatus.

Next, functional configurations of a system and apparatuses that configure the system will be described with reference to FIG. 2. FIG. 2 illustrates an example of a functional configuration of the image confirmation apparatus. As illustrated in FIG. 2, the system according to the present exemplary embodiment includes an imaging apparatus 210 and the image confirmation apparatus 220. The imaging apparatus 210 is connected to the image confirmation apparatus 220 by a network.

For example, the image confirmation apparatus 220 is connected to the imaging apparatus 210 via a universal serial bus (USB) or a local area network (LAN). Further, Picture Transfer Protocol (PTP) or a Picture Transfer Protocol/Internet Protocol (PTP/IP) is used as a communication protocol. The imaging apparatus 210 can be connected to the image confirmation apparatus 220 by either wired connection or wireless connection.

The imaging apparatus 210 includes an imaging signal notification unit 211 and an image transmission unit 212. The imaging signal notification unit 211 notifies an external apparatus of the imaging apparatus 210 of shooting performed by the imaging apparatus 210 using an imaging signal.

The image transmission unit 212 have a function of transmitting an image captured by the imaging apparatus 210 to the external apparatus. When an image transfer request from the external apparatus is received, the image transmission unit 212 transfers an image (image data) that matches the image transfer request to the external apparatus that is a sender of the image transfer request.

The image confirmation apparatus 220 includes an imaging signal acquisition unit 221, an image acquisition unit 222, and a timing adjustment unit 223 as a functional configuration for communicating with the imaging apparatus 210.

The imaging signal acquisition unit 221 has a function of acquiring an imaging signal transmitted from the imaging apparatus 210 connected to the image confirmation apparatus 220. The image confirmation apparatus 220 can detect that the imaging apparatus 210 has performed shooting according to the image signal acquired by the imaging signal acquisition unit 221.

The image acquisition unit 222 has a function of acquiring an image which has been captured by the imaging apparatus 210. Based on the imaging signal acquired by the imaging signal acquisition unit 221, the image acquisition unit 222 transmits an image transfer request to the imaging apparatus 210. The image acquisition unit 222 receives the image which is transferred from the imaging apparatus 210 in response to the image transfer request. The timing adjustment unit 223 has a function of controlling the transmission of the image transfer request so as not to transmit, when the imaging signals are continuously transmitted to the imaging signal acquisition unit 221 in a short time, the image transfer request corresponding to each of the imaging signals.

Further, the image confirmation apparatus 220 includes an image list display unit 224, a continuous image changing display unit 225, a display method changing unit 226, a continuous shooting determination unit 230, an extraction unit 228, and a management unit 229 as a functional configuration for displaying an image to an operator.

The image list display unit 224 has a function of displaying a list of images captured by the imaging apparatus 210 and transferred to the image confirmation apparatus 220 via a user interface 227. The continuous image changing display unit 225 has a function of displaying a plurality of images which have been grouped via the user interface 227 and changing the display at regular intervals. The display method changing unit 226 has a function of changing the display between the list of images and the continuous image changing display according to the circumstances.

The continuous shooting determination unit 230 causes an interval measurement unit 231 to monitor an interval of the imaging signals transmitted to the imaging signal acquisition unit 221. If an imaging signal is transferred at an interval shorter than a designated interval, the continuous shooting determination unit 230 determines that the images are captured by continuous shooting and performs grouping of the acquired images. Further, the continuous shooting determination unit 230 causes an imaging parameter acquisition unit 232 to acquire imaging parameters of the images grouped into a continuous shooting group according to the above-described method, determines a change of the imaging parameters using an imaging parameter comparison unit 233, and further divides the acquired images into groups.

Furthermore, the continuous shooting determination unit 230 similarly causes a scene determination unit 234 to analyze the images in the continuous shooting group and divides the acquired images into groups if scenes are different according to scene determination.

If an image in an image group which is displayed by the continuous image changing display displayed by the continuous image changing display unit 225 is designated, the extraction unit 228 extracts a plurality of images including the designated image as candidates of a representative image. The management unit 229 has a function of managing an image which is determined as most useful among the images in the image group determined by the continuous shooting determination unit 230.

Figure 3:
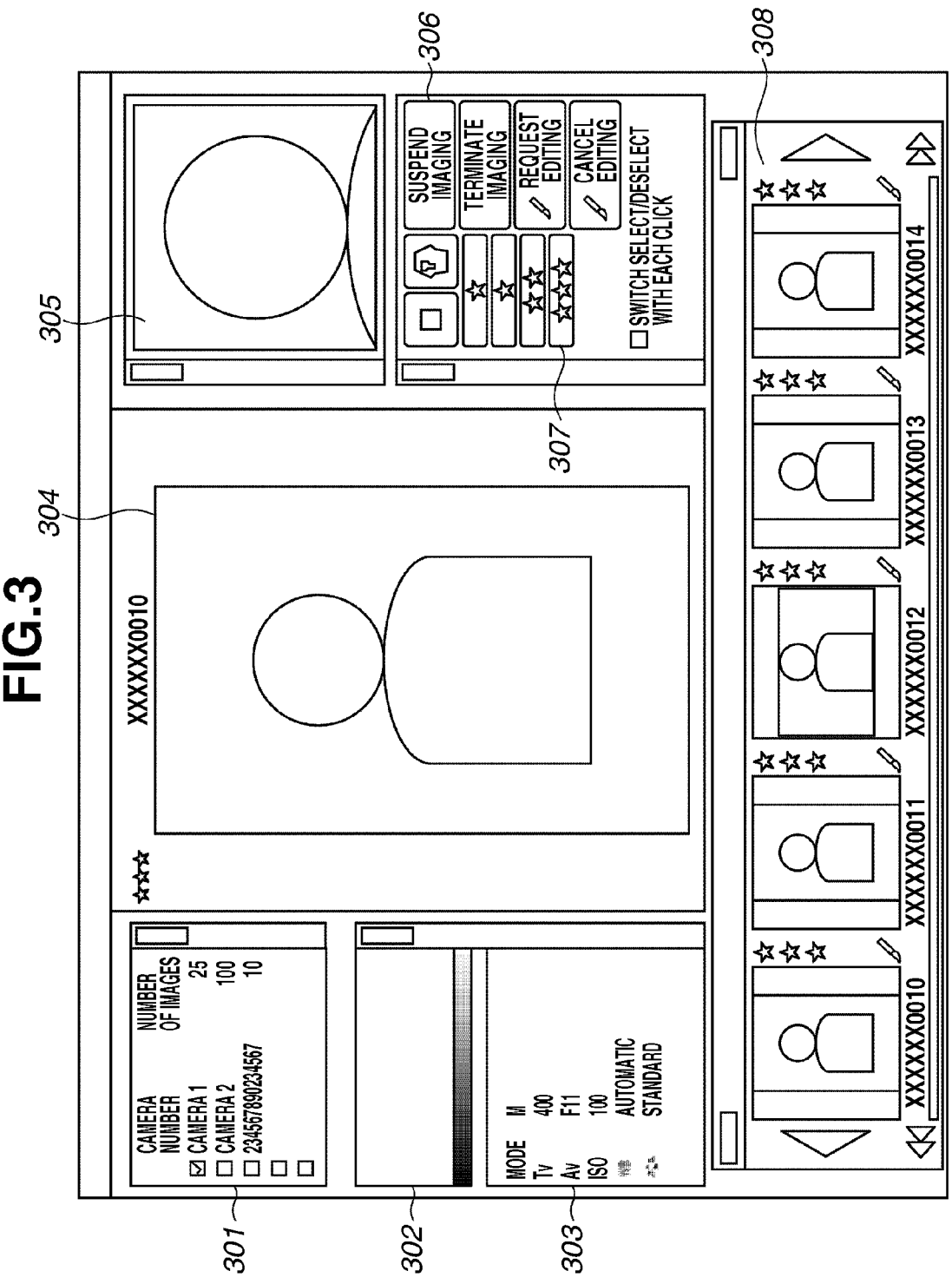
FIG. 3 illustrates an example of a user interface.

The image confirmation apparatus 220 further includes the user interface 227 used for presenting the above-described processing result to a user and receiving an instruction input by the user via the screen as the functional configuration. The user interface 227 will be described below with reference to FIG. 3 that illustrates an example of the user interface.

A screen displayed on the monitor 110 by the user interface 227 includes an imaging apparatus list display area 301, an image histogram display area 302, an imaging parameter list display area 303, an image main display area 304, and an image sub display area 305. Further, the screen displayed on the monitor 110 by the user interface 227 includes an imaging work operation area 306, an image evaluation area 307, and an image list display area 308.

A list of the imaging apparatuses associated with the image confirmation apparatus 220 is displayed in the imaging apparatus list display area 301. In addition to the list of the imaging apparatuses, a number of images captured by each of the imaging apparatuses are displayed in the imaging apparatus list display area 301. Further, whether the imaging apparatuses are connected to the image confirmation apparatus 220 or not are displayed in the imaging apparatus list display area 301 by changing the display between "connected" and "disconnected".

A histogram of the image displayed in the image main display area 304 is displayed in the image histogram display area 302. Imaging parameters of the image displayed in the image main display area 304 when it has been captured are displayed in the imaging parameter list display area 303.

In the image main display area 304, one image selected from the images displayed in the image list display area 308 is displayed. Further, there are two display methods. One is a fit display method in which the whole image is displayed. The other is a direct display method in which a portion of an image is displayed at the same magnification. When an image is captured, the image displayed in the image main display area 304 can be changed to a latest captured image.

The image sub display area 305 can display a portion of an image displayed in the image main display area 304. For example, if a human figure is captured in the image displayed in the image main display area 304, it is possible to display only his/her face in the image sub display area 305. Further, if an image is displayed by the direct display method in the image main display area 304, a whole picture of the image displayed in the image main display unit is displayed in the image sub display area 305.

By operating an imaging work operation portion of the imaging work operation area 306, a user can input an instruction to terminate or suspend image capturing.

By pressing an image evaluation portion of the image evaluation area 307, the user can set an image which the user does not want other people to see to "evaluation 0", or set an image which the user desires to use for a next selection or presentation to "evaluation 3". Although four grades, 0 to 3, are provided as the evaluation levels in FIG. 3, the grades may be two grades (i.e., necessary or unnecessary) or six grades from 0 to 5.

A list of images captured during shooting is displayed in the image list display area 308. If new shooting is performed, the latest captured image is added to the bottom of the image list. By selecting the imaging apparatus displayed in the imaging apparatus list display area 301, the user can also change display/non-display of the image captured by the imaging apparatus. Further, a thumbnail image which is an image displayed in a small area, evaluation information which is a result of evaluation performed by the image evaluation portion of the image evaluation area 307, editing request information which is given when editing is instructed by the imaging work operation portion of the imaging work operation area 306, and an arbitrary image number are displayed in the imaging apparatus list display area 301.

Figure 4:
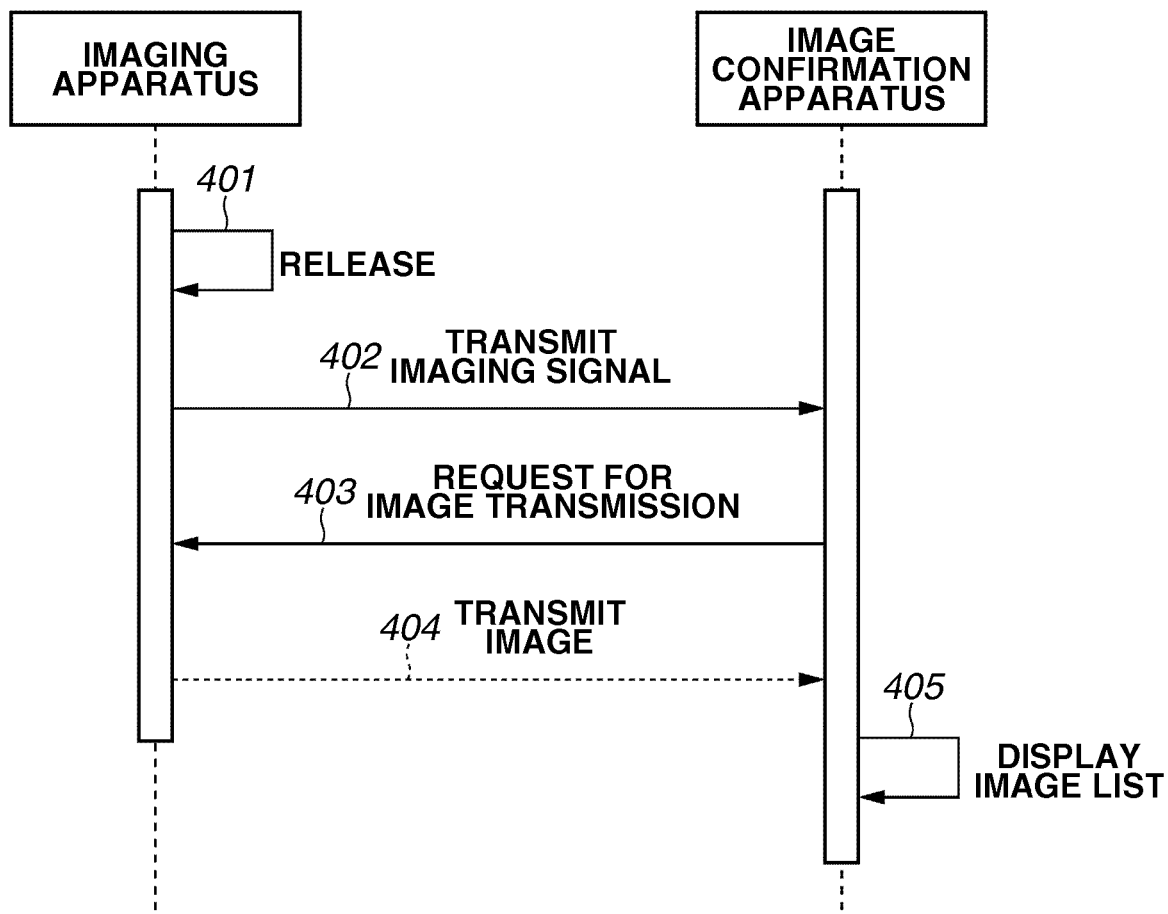
FIG. 4 illustrates an example of a sequence of image acquisition when single shooting is performed.

Next, image acquisition between the imaging apparatus 210 and the image confirmation apparatus 220 when single shooting is performed will be described with reference to FIG. 4. FIG. 4 is a sequence diagram illustrating an example of the image acquisition when the image is captured by single shooting.

In step 401, the imaging apparatus 210 is released and shooting is performed. According to the present exemplary embodiment, release means that a shutter of the imaging apparatus 210 is pressed. In step 402, in order to notify the image confirmation apparatus 220 that the shooting has been performed, the imaging signal notification unit 211 of the imaging apparatus 210 transmits an imaging signal to the image confirmation apparatus 220.

Then, the imaging signal acquisition unit 221 of the image confirmation apparatus 220 receives the imaging signal. In step 403, the image acquisition unit 222 of the image confirmation apparatus 220 transmits a transfer request for an image corresponding to the imaging signal to the imaging apparatus 210. In step 404, in response to the transfer request, the image transmission unit 212 of the imaging apparatus 210 transfers the image to the image confirmation apparatus 220.

In step 405, the image acquisition unit 222 of the image confirmation apparatus 220 receives the image transferred in step 404. Then, the user interface 227 of the image confirmation apparatus 220 displays the image received according to an instruction given by the image list display unit 224 in the image list display area 308.

Figure 5:
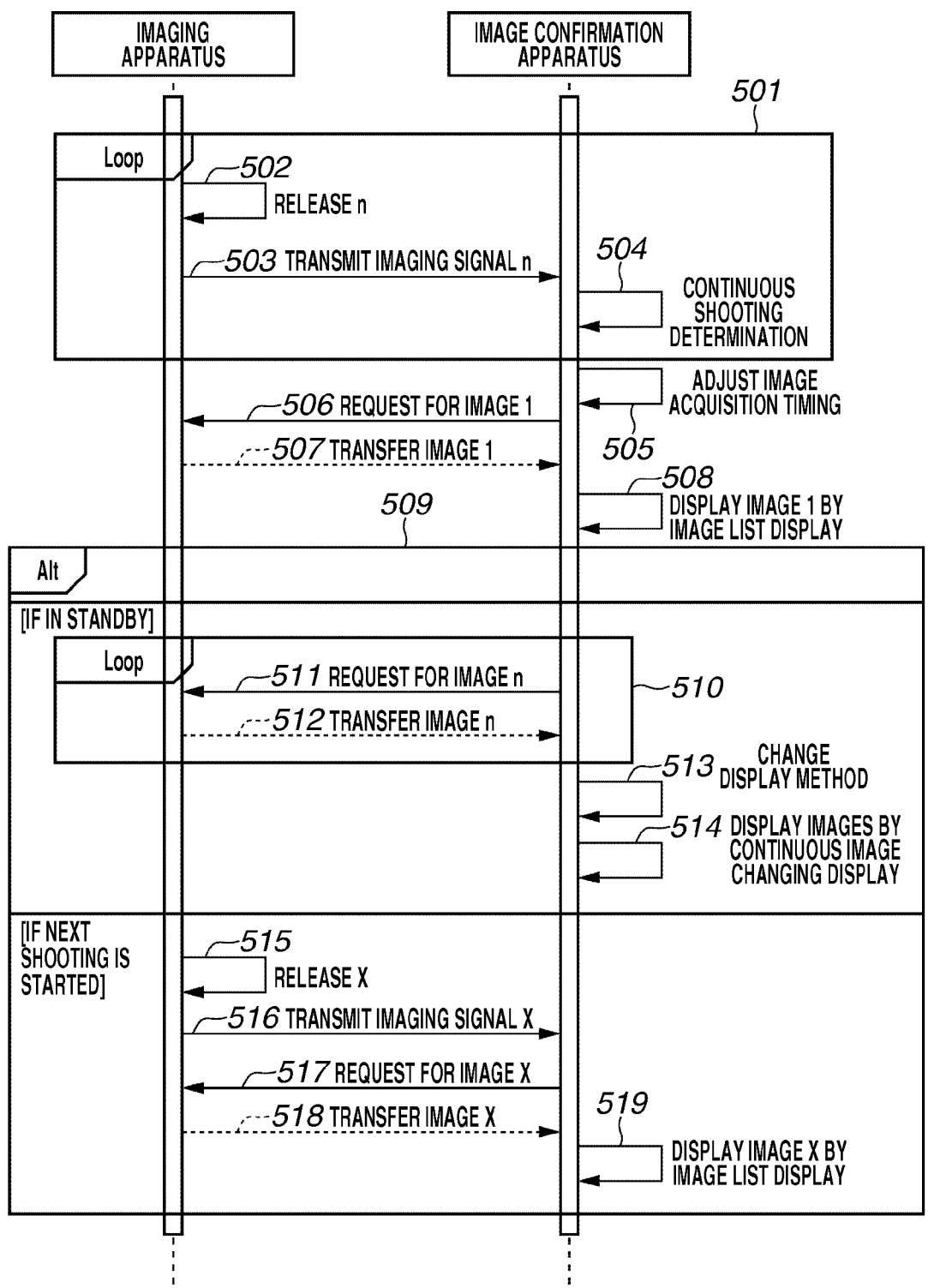
FIG. 5 illustrates an example of a sequence of image acquisition when continuous shooting is performed.

Next, the process of image acquisition performed between the imaging apparatus 210 and the image confirmation apparatus 220 when images are continuously captured will be described with reference to FIG. 5. FIG. 5 is a sequence diagram illustrating an example of the image acquisition when the images are continuously captured (continuous shooting).

When continuous shooting is performed by the imaging apparatus 210, a loop 501 is repeated. In step 502, the release of the imaging apparatus 210 is performed n times in the loop 501. In the present exemplary embodiment, the n-th release is expressed as "release n". In step 503, the imaging apparatus 210 performs the release n, and an imaging signal n corresponding to the release n is transmitted from the imaging signal notification unit 211 to the image confirmation apparatus 220. Then, the imaging signal acquisition unit 221 of the image confirmation apparatus 220 receives the imaging signal n.

In step 504, the continuous shooting determination unit 230 determines whether continuous shooting is performed based on the imaging signal. In determination of whether the shooting is continuous shooting, first, the interval measurement unit 231 in the continuous shooting determination unit 230 measures a time difference between two adjacent received imaging signals. If the measured time difference is shorter than a time set in advance, the continuous shooting determination unit 230 determines that the imaging apparatus 210 has performed the continuous shooting.

If the continuous shooting determination unit 230 determines that the continuous shooting has been performed, in step 505, the timing adjustment unit 223 adjusts a timing the image confirmation apparatus 220 acquires the image corresponding to the imaging signal n. For example, the timing adjustment unit 223 adjusts an image acquisition timing such that the image confirmation apparatus 220 acquires only the image corresponding to the imaging signal 1 that has been captured first and does not acquire immediately the rest of the plurality of images captured by the continuous shooting. In step 506, when the timing is adjusted as described above, the image acquisition unit 222 transmits a transfer request to the imaging apparatus 210 for an image 1 that corresponds to the imaging signal 1.

In step 507, upon receiving the transfer request, the image transmission unit 212 of the imaging apparatus 210 transfers the image 1 to the image confirmation apparatus 220. Thus, the image acquisition unit 222 of the image confirmation apparatus 220 receives the transferred image 1. In step 508, based on an instruction given by the image list display unit 224 or the like, the user interface 227 displays the image 1 in the image list display area 308.

Since the image acquisition timing is adjusted in step 505, not all of the images captured by the continuous shooting are transferred from the imaging apparatus 210 to the image confirmation apparatus 220. Next, handling of images which are not transferred will be described. Processing of the images which are not transferred is changed at a conditional branch 509 according to shooting determination. The condition for branching at the conditional branch 509 is whether there is a time gap after the continuous shooting has been performed in the loop 501 to the next release.

If there is a time to the next release, in other words, if the imaging signal is not transmitted to the image confirmation apparatus 220 and the image confirmation apparatus 220 stays in a standby state. Such a case will be described. If the image confirmation apparatus 220 is in the standby state (during standby), in step 511, according to the adjustment made by the timing adjustment unit 223, an acquisition request for an image n which corresponds to the imaging signal n being the n-th imaging signal, is transmitted from the image acquisition unit 222 to the imaging apparatus 210.

Upon receiving the acquisition request, in step 512, the image transmission unit 212 of the imaging apparatus 210 transfers the image to the image confirmation apparatus 220, and the image acquisition unit 222 receives the transferred image. This processing is repeated in the loop 510 until the image confirmation apparatus 220 acquires all the images. When the acquisition of all the images is completed, in step S513, for example, the user interface 227 changes the display method of images from the image list display to the continuous image changing display based on an instruction transmitted from the continuous image changing display unit 225.

In step 514, since the display method of images is changed in step 513, based on an instruction sent from the continuous image changing display unit 225, the user interface 227 displays the images captured by a series of the continuous shooting by the continuous image changing display. On the other hand, if shooting is performed by the imaging apparatus 210 during the loop 510 and a new imaging signal is transmitted to the image confirmation apparatus 220, then the image confirmation apparatus 220 suspends the process in the loop 510, and the process returns to the conditional branch 509.

Next, a case where shooting is performed by the imaging apparatus 210 before all the images captured by the continuous shooting are acquired will be described. In step 515, after the continuous shooting and before all the images captured by the continuous shooting are acquired by the loop 510, the shooting of the next scene is performed by the imaging apparatus 210. In FIG. 5, the release of the image capturing performed in step 515 is expressed as release X. In step 516, in order to notify the image confirmation apparatus 220 of the release X, the imaging signal notification unit 211 of the imaging apparatus 210 transmits an imaging signal X corresponding to the release X to the image confirmation apparatus 220. Then, the transmitted imaging signal X is received by the imaging signal acquisition unit 221 of the image confirmation apparatus 220.

Then, the timing adjustment unit 223 adjusts the timing so that acquisition of the image X corresponding to the imaging signal X is given a higher priority than acquisition of the images captured by the continuous shooting. In step 517, the image acquisition unit 222 transmits a transfer request for the image X to the imaging apparatus 210 according to the adjustment. Upon receiving the transfer request, in step 518, the image transmission unit 212 of the imaging apparatus 210 transmits the image X to the image confirmation apparatus 220 and the image acquisition unit 222 of the image confirmation apparatus 220 receives the image X. In step 519, based on an instruction given by the image list display unit 224, the user interface 227 displays the acquired image X in a list.

Next a case where continuous shooting is performed again after continuous shooting has been performed will be described. In the description below, a first continuous shooting is referred to as continuous shooting A and the continuous shooting performed after the continuous shooting A is referred to as continuous shooting B. When the continuous shooting A is performed, the image confirmation apparatus 220 acquires only a first image of the continuous shooting A. After then, according to the adjustment made by the timing adjustment unit 223, acquisition of the rest of the images captured by the continuous shooting A is temporarily suspended. Next, the continuous shooting B is performed. Similar to the continuous shooting A, the image confirmation apparatus 220 acquires only a first image of the continuous shooting B.

After that, it is assumed that the image confirmation apparatus 220 is changed to the standby state. Then, the timing adjustment unit 223 adjusts the processing of image acquisition by the image acquisition unit 222 so that the rest of the images captured by the continuous shooting A are acquired first and then the rest of the images captured by the continuous shooting B are acquired. In other words, if the continuous shooting A and the continuous shooting B are consecutively performed, the image confirmation apparatus 220 acquires the images in the order of the first image of the continuous shooting A, the first image of the continuous shooting B, the second and subsequent images of the continuous shooting A, and the second and subsequent images of the continuous shooting B.

Figure 6A:
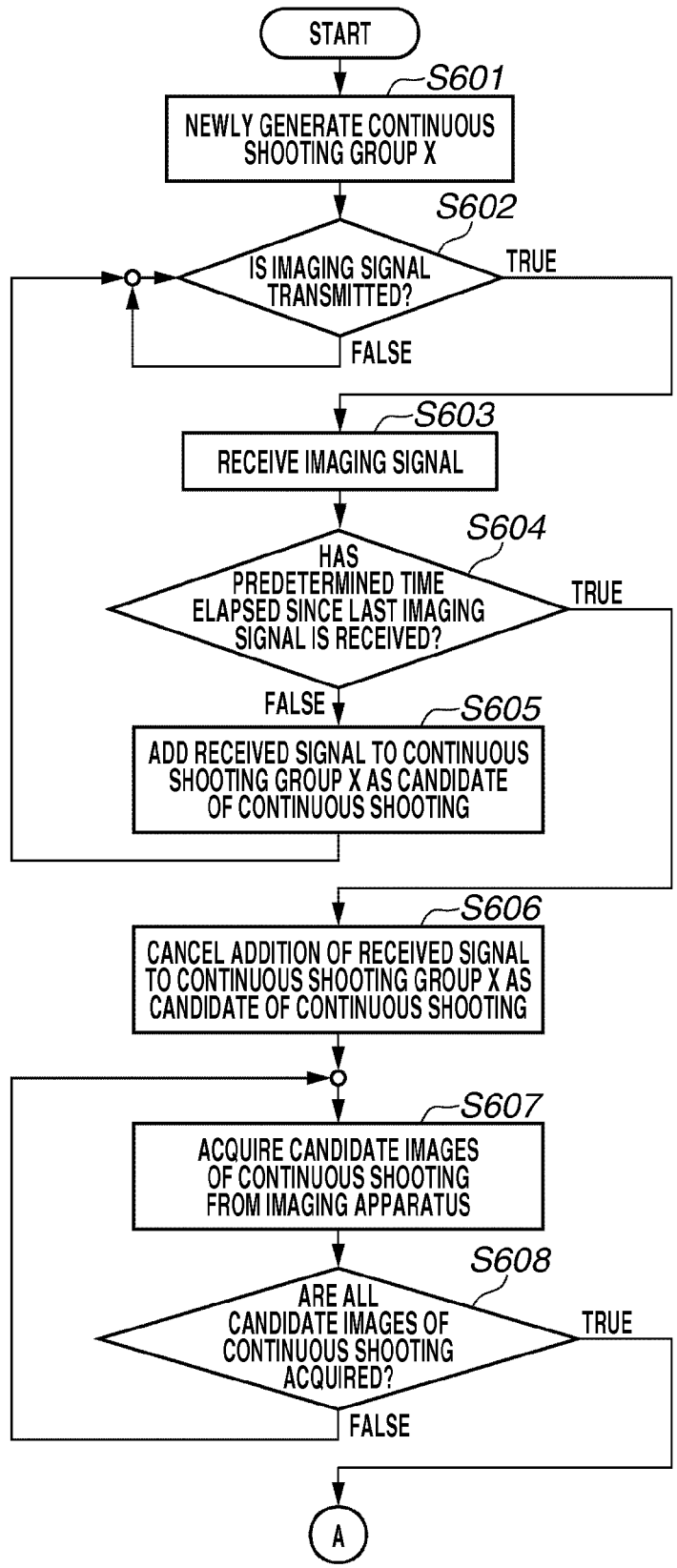
FIGS. 6A and 6B are a flowchart illustrating an example of processing regarding determination of continuous shooting.
Figure 6B:
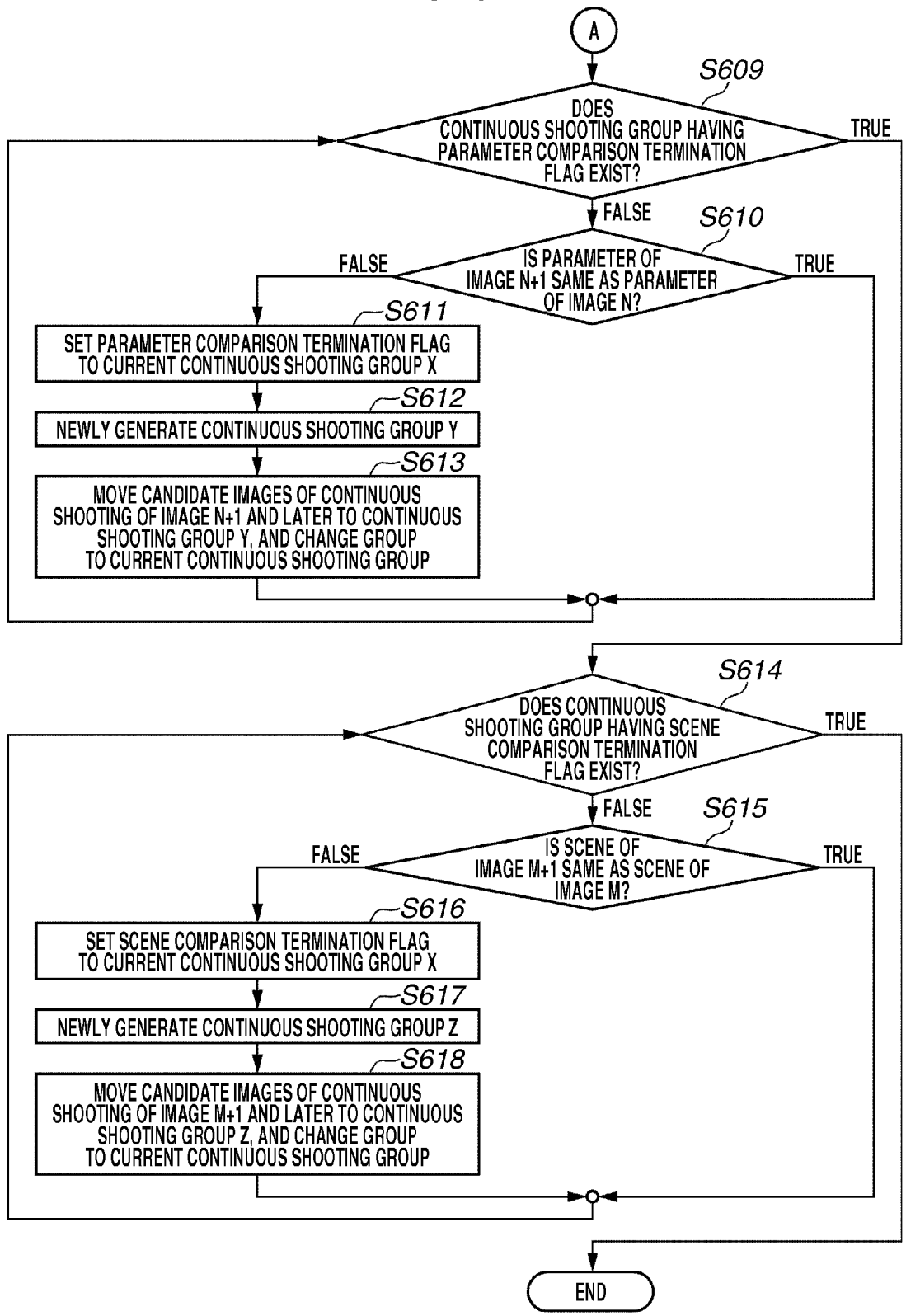

Next, an example of processing of the continuous shooting determination will be described with reference to FIGS. 6A and 6B. FIGS. 6A and 6B are a flowchart illustrating an example of processing of the continuous shooting determination.

In step S601, the continuous shooting determination unit 230 generates a continuous shooting group. In the description below, the generated continuous shooting group is referred to as a continuous shooting group X. In step S602, after the continuous shooting group X is generated, the continuous shooting determination unit 230 waits for receiving an imaging signal transmitted from the imaging apparatus 210. If the imaging signal is transmitted (TRUE in step S602), the processing proceeds to step S603. In step S603, the imaging signal transmitted from the imaging signal notification unit 211 is received by the imaging signal acquisition unit 221.

In step S604, the interval measurement unit 231, which has received a notification from the imaging signal acquisition unit 221 that the imaging signal acquisition unit 221 has received the imaging signal, measures time that elapsed since the imaging signal has been received the previous time. The continuous shooting determination unit 230 determines whether the elapsed time is longer than the time set in advance.

If the time is less than the time set in advance (FALSE in step S604), the processing proceeds to step S605. In step S605, the continuous shooting determination unit 230 adds the received signal as a candidate of the continuous shooting to the continuous shooting group X. Then, the processing returns to step S602 and the continuous shooting determination unit 230 waits for a notification of an imaging signal. In step S604, if the time is longer than the time set in advance (TRUE in step 5604), then the processing proceeds to step S606. In step S606, the continuous shooting determination unit 230 cancel addition of the received signal as a candidate of the continuous shooting to the continuous shooting group X.

In step S607, based on the imaging signal included in the continuous shooting group X and a request from the continuous shooting determination unit 230, the image acquisition unit 222 acquires an image being a candidate of the continuous shooting from the imaging apparatus 210. In step S608, the image acquisition unit 222 determines whether all the candidate images of the continuous shooting are acquired. If all the images are acquired (TRUE in step S608), the processing proceeds to step S609, and the continuous shooting determination unit 230 determines the continuous shooting group from the candidate images of the continuous shooting. If all the images are not acquired yet (FALSE in step S608), the processing returns to step S607, and the image acquisition unit 222 repeats the image acquisition processing until all the images are acquired.

In step S609, the continuous shooting determination unit 230 determines whether the shooting is continuous shooting according to the change in the imaging parameters. First, the continuous shooting determination unit 230 determines whether a continuous shooting group with a parameter comparison termination flag exists. As a result of the determination, if a continuous shooting group with a parameter comparison termination flag exists (TRUE in step S609), the processing proceeds to step S614, and the continuous shooting determination unit 230 performs scene determination processing. On the other hand, if a continuous shooting group does not have a parameter comparison termination flag (FALSE in step S609), the processing proceeds to step S610.

In step S610, the continuous shooting determination unit 230 causes the imaging parameter acquisition unit 232 to acquire imaging parameters of a target image N and that of an image N+1 next to the target image N, and causes the image parameter comparison unit 233 to compare the imaging parameters. As a result of comparison, if the parameters are the same (TRUE in step S610), the processing returns to step S609, and the continuous shooting determination unit 230 processes the next image without processing the current target image N. If the parameters are different (FALSE in step S610), the processing proceeds to step S611. In step S611, the continuous shooting determination unit 230 sets the parameter comparison termination flag with respect to the current continuous shooting group X.

In step S612, the continuous shooting determination unit 230 newly generates a continuous shooting group Y. In step S613, the continuous shooting determination unit 230 moves all the images on and after the image N+1 to the newly generated continuous shooting group Y, and sets the continuous shooting group Y as the current continuous shooting group. After performing the processing in step S613, the processing returns to step S609 and the continuous shooting determination unit 230 determines again whether a parameter comparison termination flag exists. Since the continuous shooting group X has the parameter comparison termination flag, the processing proceeds to step S614, and the continuous shooting determination unit 230 performs the scene determination processing. On the other hand, since the continuous shooting group Y still does not have the parameter comparison termination flag, the continuous shooting determination unit 230 performs the comparison processing of the imaging parameters thereof.

As described above, the continuous shooting determination unit 230 also performs the scene determination processing. In step S614, the scene determination unit 234 determines whether a continuous shooting group having a scene comparison termination flag exists. If a continuous shooting group having such a flag exists (TRUE in step S614), the determination processing of such a group ends. If a continuous shooting group having such a flag does not exist (FALSE in step S614), the processing proceeds to step S615.

In step S615, the scene determination unit 234 compares a scene of a target image M and a scene of the next image (i.e., image M+1). The scenes are compared according to a conventional method. If the scenes are the same (TRUE in step S615), the scene determination unit 234 processes the next image without processing the current target image M. If the scenes are different (FALSE in step S615), the processing proceeds to step S616. Instep S616, the scene determination unit 234 sets a scene comparison termination flag to the current continuous shooting group X.

In step S617, the scene determination unit 234 newly generates a continuous shooting group Z. In step S618, the scene determination unit 234 moves all the images on and after the image M+1 to the newly generated continuous shooting group Z, and sets the continuous shooting group Z as the current continuous shooting group. After performing the processing in step S618, the processing returns to step S614 and the scene determination unit 234 determines again whether a scene comparison termination flag exists. Since the continuous shooting group X has the scene comparison termination flag, the processing performed by the scene determination unit 234 ends. On the other hand, since the continuous shooting group Z still does not have the scene comparison termination flag, the scene determination unit 234 continues the comparison processing of the imaging scenes.

In the above description, although the continuous shooting determination unit 230 performs the determination of the continuous shooting group according to the interval of the arrival of the imaging signals, change in the imaging parameters, and change in the scenes, all of these three determinations is not always necessary. For example, a user can select whether to perform or not the above-described determination via the screen.

Next, the image list display of the image confirmation apparatus 220 at the time of continuous shooting will be described with reference to FIGS. 7A to 7C. FIGS. 7A to 7C illustrate examples of the image list display at the time of continuous shooting.

A conventional image confirmation apparatus displays an image captured by single shooting and an image captured by continuous shooting without making a distinction between them. Thus, a problem that an image list display area, such as the one illustrated in FIG. 7A, is filled with substantially similar images may arise. According to the image confirmation apparatus 220 of the present exemplary embodiment, an image captured by single shooting is distinguished from an image captured by continuous shooting according to the above-described processing of continuous shooting determination, and displayed separately (displayed in a distinguishable manner). Thus, the above described problem can be solved.

To be more precise, the image confirmation apparatus 220 according to the present exemplary embodiment displays an image such as the one illustrated in FIG. 7B. In FIG. 7B, a plurality of images 701 captured by continuous shooting are displayed in a style different from that of the images captured by single shooting. In other words, the images are displayed in an overlapping manner. Further, the display state of the plurality of images 701 indicates that all of the images captured by the continuous shooting are not acquired yet.

If all of the images captured by the continuous shooting are acquired, the images are displayed in a style illustrated in FIG. 7C. More specifically, the user interface 227 displays an icon 702 that indicates a continuous shooting group below an image. Further, the plurality of images in the continuous shooting group is displayed in continuously changing manner in an image display area 703.

Since the image confirmation apparatus 220 displays the images according to continuous image changing display, a user can clearly distinguish the images captured by continuous shooting from the images captured by single shooting in the same display area. Further, since the image confirmation apparatus 220 displays the images captured by continuous shooting in the order they are captured, the user can select a desired image from the group of images captured by the continuous shooting more easily.

Although the image list is displayed in a single horizontal row in the example illustrated in FIG. 7, the image confirmation apparatus 220 may display the image list in a vertical row or by arranging like tiles. Further, the plurality images 701 are displayed in an overlapping manner so that the images captured by continuous shooting can be distinguished from the images captured by single shooting. Thus, the image confirmation apparatus 220 can display the images by a display method different from the overlapping manner so long as the images captured by single shooting and the images captured by continuous shooting can be distinguished. Further, regarding the icon 702, the image confirmation apparatus 220 can use a shape and a display position of the icon 702 different from those in the above-described example.

Figure 8A:
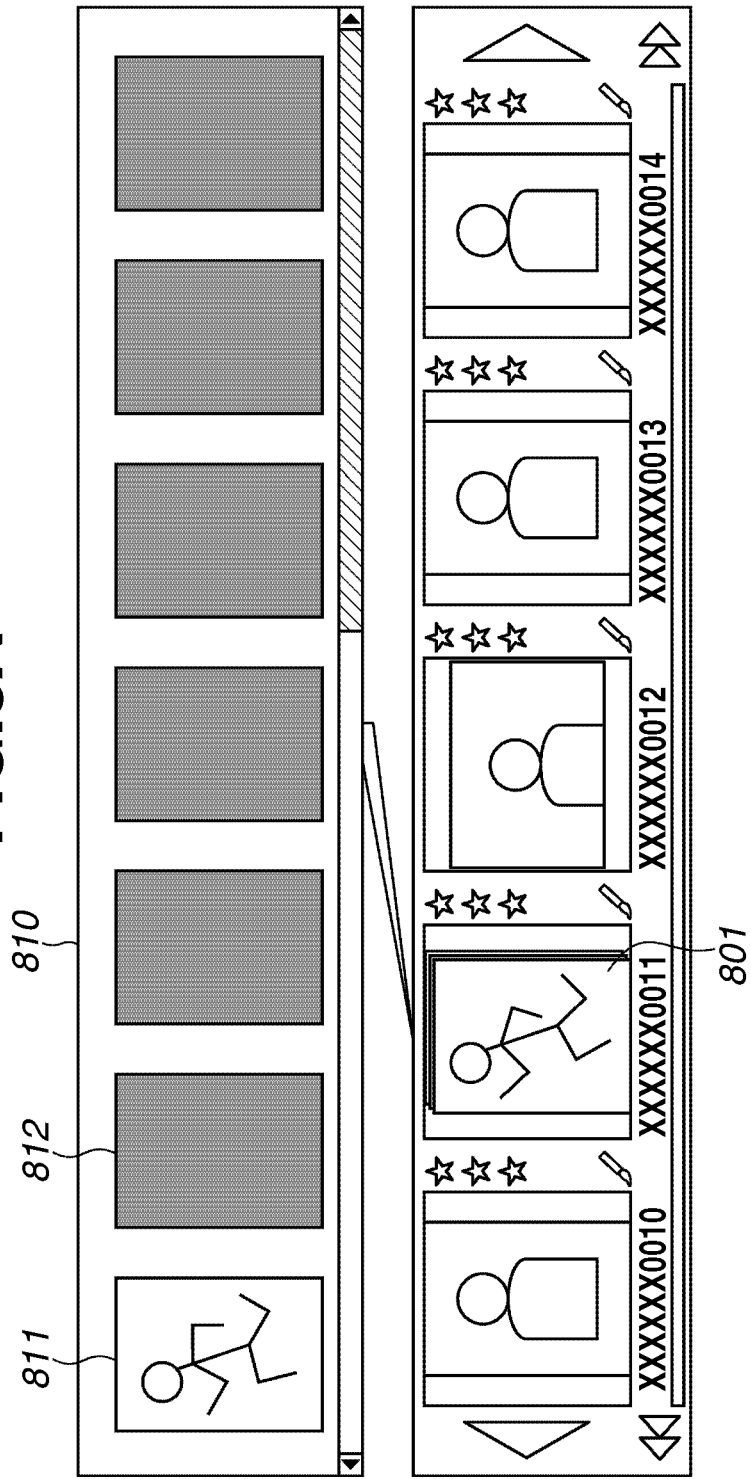

Next, the image list display of the image confirmation apparatus 220 which is used for acquiring an image captured by continuous shooting will be described with reference to FIGS. 8A to 8C. FIGS. 8A to 8C illustrate examples of the image list display when the images captured by continuous shooting are acquired.

FIG. 8A illustrates a plurality of images captured by continuous shooting are spread. In order to change the screen illustrated in FIG. 7B to the screen illustrated in FIG. 8A, for example, a user clicks an image 801 which is displayed as a group of images captured by continuous shooting. In an area 810, a plurality of images captured by continuous shooting are displayed in the order they are captured.

FIG. 8A illustrates a state where next shooting is continuously performed after the continuous shooting and only a first image 811 has been acquired among the images captured by the continuous shooting. The image confirmation apparatus 220 can recognize that the shooting has been performed when it receives an imaging signal. Thus, if the image confirmation apparatus 220 has received the imaging signal and does not acquire the image yet, as an example of image information, a black area 812 (a black image or a rectangle information area) is displayed. The black area 812 is changed to an actual image when the image confirmation apparatus 220 acquires an image corresponding to the imaging signal of that area.

If continuous shooting is performed, the image confirmation apparatus 220 acquires the rest of the images from the imaging apparatus 210 when the image confirmation apparatus 220 is not receiving an imaging signal, i.e., in the standby state, unless a special instruction is given. However, if the user thinks that good images were captured in the latter part of the continuous shooting, then the user needs to wait for a considerable amount of time until the last image is transferred.

Thus, the user selects, for example, a black area 802 as illustrated in FIG. 8B. Based on the user's selection operation, the timing adjustment unit 223 transmits an imaging signal corresponding to the selected black area to the image acquisition unit 222. Then, the image acquisition unit 222 can acquire the image corresponding to the black area from the imaging apparatus on a priority basis before other images are acquired.

In FIG. 8B, the image 802 is selected. Thus, an imaging signal corresponding to the image 802 is transmitted from the timing adjustment unit 223 to the image acquisition unit 222. Accordingly, the image corresponding to the black area is acquired on a priority basis before other images are acquired. In this manner, as illustrated in FIG. 8C, an image 803 can be displayed before the other images captured earlier than the image 803 are displayed.

Next, the image list display of the image confirmation apparatus 220 when a user selects a representative image from a continuous shooting group will be described with reference to FIG. 9. FIG. 9 illustrates an example of the image list display which is used when a representative image is selected.

With respect to the image group all of whose images are acquired from the imaging apparatus 210, the image confirmation apparatus 220 performs continuous image changing display in an area 901 in the display area. A user checks the captured images displayed by the continuous image changing display. When a desired image is displayed, the user designates the image at that timing. Although the image can be designated, for example, by clicking, a different method can also be used.

When the image is designated, the extraction unit 228 which extracts candidate images for a representative image extracts a designated image and a few images before and after the designated image. Then, the extraction unit 228 displays the extracted images via the user interface 227 in the area 910.

The user interface 227 displays an icon 902 that indicates a continuous shooting group below an image. Then, the user selects a representative image of the images of the continuous shooting group from the images displayed in the area 910. Although the image can be selected, for example, by clicking, a different method can also be used.

If the user selects an image 911 as the representative image, the display method changing unit 226 performs control so that the area 910 where the candidate images of the representative image have been displayed is no longer displayed and changes the display method. For example, the display method changing unit 226 changes the display method such that only the representative image is displayed in a list in the area 901. Further, the management unit 229 manages the image 911 selected as the representative image.

According to the present exemplary embodiment, by adjusting acquisition of the images when the images are captured by continuous shooting by the imaging apparatus, an image of a next scene of the continuous shooting can be acquired on a priority basis than images captured by the continuous shooting. In other words, when an image that was captured after the continuous shooting is checked, the time that the imaging confirmation apparatus waits for the image to be transferred can be reduced. Additionally, according to the present exemplary embodiment, a user can check images of a scene which are captured after the continuous shooting, and then the user can perform the next shooting based on the check. Thus, the time necessary in performing the next shooting can be reduced.

Further, according to the present exemplary embodiment, a plurality of images captured by the imaging apparatus according to continuous shooting can be displayed by continuous image changing display. In other words, according to the present exemplary embodiment, not all of the similar images captured by continuous shooting are displayed by a list. Furthermore, according to the present exemplary embodiment, while a group of similar images captured by continuous shooting are being displayed by continuous image changing display, the continuous image changing display can be suspended at arbitrary timing at which a desired image may be acquired, and images near the desired image can be presented to the user as candidate images. Thus, from a number of similar images captured by the continuous shooting, the user can narrow down the number of candidate images from which the desired image can be selected. In this manner, time necessary in extracting a necessary image required after the continuous shooting can be reduced.

The present invention can be realized by a CPU of an apparatus reading out a software program code from a storage medium and executing it. Further, an operating system (OS) or the like can execute a part or whole of the actual processing based on an instruction of the program code which has been read out. Such a case is also included in the above-described exemplary embodiments.

According to the above described exemplary embodiments, a user can easily check a captured image even if images are captured by continuous shooting by an imaging apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-291201 filed Dec. 22, 2009, which is hereby incorporated by reference herein in its entirety.

What is claimed is:

1. An apparatus comprising:
an acquisition device configured to acquire a plurality of images;
a determination device configured to determine whether the plurality of images are taken by continuous shooting; and
a display device configured to display, if it is determined that the plurality of images have been taken by continuous shooting, on a first display area of a display unit, at least one image of the plurality of images of the continuous shooting in proximity to a next shooting image as candidate images for a representative image, and, if a desired image is selected from the candidate images, display, on a second display area of the display unit, the desired image as the representative image and not display the first display area.

2. The apparatus according to claim 1, wherein the acquisition device acquires the next shooting image by controlling transmission of a transfer request of the at least one image of the plurality of images related to shooting if the continuous shooting is being performed.

3. The apparatus according to claim 1, wherein the display device displays the at least one image of the plurality of images of the continuous shooting in a first style and an image related to a single shooting in a second style.

4. The apparatus according to claim 1, further comprising an adjustment device configured to adjust image acquisition by temporarily suspending reception of remaining images of the continuous shooting, if a next shooting image is detected at an arbitrary point in time.

5. The apparatus according to claim 4, wherein if a next shooting has ended, the adjustment device adjusts acquisition of the plurality of images such that the remaining images of the continuous shooting that have not been acquired due to the adjustment are acquired.

6. The apparatus according to claim 4, wherein, if the acquisition device acquires the remaining images of the continuous shooting that have not been acquired due to the adjustment, the display device displays the remaining images of the continuous shooting by a continuous image changing display.

7. The apparatus according to claim 4, wherein, if the at least one image of the plurality of images of the continuous shooting is selected, the display device displays the at least one image of the plurality of images of the continuous shooting.

8. A method comprising:
acquiring a plurality of images;
determining whether the plurality of images are taken by continuous shooting;
displaying, if it is determined that the plurality of images have been taken by continuous shooting, on a first display area of a display unit, at least one image of the plurality of images of the continuous shooting in proximity to a next shooting image as candidate images for a representative image; and
displaying, if a desired image is selected from the candidate images, on a second display area of the display unit, the desired image as the representative image and not displaying the first display area.

9. The method according to claim 8, further comprising controlling transmission of a transfer request of the next shooting image related to shooting if the continuous shooting is being performed.

10. The method according to claim 8, further comprising displaying the at least one image of the plurality of images of the continuous shooting in a first style and an image related to a single shooting in a second style.

11. The method according to claim 8, further comprising adjusting image acquisition by temporarily suspending reception of remaining images of the continuous shooting, if a next shooting image is detected at an arbitrary point in time.

12. The method according to claim 11, further comprising, if a next shooting has ended, adjusting acquisition of the plurality of images such that the remaining images of the continuous shooting that have not been acquired due to the adjustment are acquired.

13. The method according to claim 11, further comprising:
acquiring the remaining images of the continuous shooting that have not been acquired due to the adjustment; and
displaying the remaining images of the continuous shooting by a continuous image changing display.

14. The method according to claim 8, further comprising if the at least one image of the plurality of images of the continuous shooting is selected, displaying the at least one image of the plurality of images of the continuous shooting.

15. A non-transitory computer-readable storage medium storing a computer-executable program of instructions for causing a computer to perform a method for controlling an apparatus, the method comprising:
acquiring a plurality of images;
determining whether the plurality of images are taken by continuous shooting;
displaying, if it is determined that the plurality of images have been taken by the continuous shooting, on a first display area of a display unit, at least one image of the plurality of images of the continuous shooting in proximity to a next shooting image as candidate images for a representative image; and
displaying, if a desired image is selected from the candidate images, on a second display area of the display unit, the desired image as the representative image and not displaying the first display area.

16. The non-transitory computer-readable storage medium according to claim 15, wherein the method further comprises controlling transmission of a transfer request of the next shooting image related to shooting.

17. The non-transitory computer-readable storage medium according to claim 15, wherein the method further comprises displaying the at least one image of the plurality of images of the continuous shooting in a first style and an image related to a single shooting in a second style.

18. The non-transitory computer-readable storage medium according to claim 15, wherein the method further comprises adjusting image acquisition by temporarily suspending reception of remaining images of the continuous shooting, if a next shooting image is detected at an arbitrary point in time.

19. The non-transitory computer-readable storage medium according to claim 18, wherein the method further comprises, if a next shooting has ended, adjusting acquisition of the plurality of images such that the remaining images of the continuous shooting that have not been acquired due to the adjustment are acquired.

20. The non-transitory computer-readable storage medium according to claim 18, wherein the method further comprises:
acquiring the remaining images of the continuous shooting that have not been acquired due to the adjustment; and
displaying the remaining images of the continuous shooting by a continuous image changing display.

21. The non-transitory computer-readable storage medium according to claim 15, wherein the method further comprises if the at least one image of the plurality of images of the continuous shooting is selected, displaying the at least one image of the plurality of images of the continuous shooting.

22. The apparatus according to claim 1, wherein the plurality of images are transmitted from an imaging apparatus.

23. The apparatus according to claim 1, wherein the determination device determines whether continuous shooting has been performed by an imaging apparatus based on an imaging signal related to shooting transmitted from the imaging apparatus.

24. The method according to claim 8, wherein determining whether the continuous shooting has been performed is based on an imaging signal related to shooting.

25. The non-transitory computer-readable storage medium according to claim 15, wherein determining whether the continuous shooting has been performed is based on an imaging signal related to shooting.

* * * * *